Patented Aug. 6, 1929.

1,723,444

UNITED STATES PATENT OFFICE.

JOSEF SAVELSBERG, OF PAPENBURG-ON-THE-EMS, GERMANY, ASSIGNOR TO C. SCHLESINGER & TRIER, KOMMANDITGESELLSCHAFT AUF AKTIEN, OF BERLIN, GERMANY.

METHOD OF PRODUCING METALS.

No Drawing. Application filed October 28, 1927, Serial No. 229,536, and in Germany November 29, 1926.

The invention relates to an improved method of producing metals or metallic combinations from ores, minerals, rocks, or products of the metallurgical and chemical industry or any other substances containing such metals and the said method is especially applicable for the production or recovery of metals of the platinum group from ores, minerals, rocks or any other substances containing the same.

The object of my invention is to provide a method of treating the ores or materials containing metal or metals to be recovered with a view to adapt the ores or materials for a subsequent magnetic separating process. With this object in view I heat the materials containing the metals to be recovered in the presence of a suitable reducing agent and then allow the heated material to cool down, both the heating and cooling in a non oxidizing atmosphere. A dull red heat gives good results.

The reducing agent may be a solid substance or a liquid or even of gaseous nature. In this way the materials are influenced in a manner that a magnetic portion and a non magnetic portion are formed, which can be separated by electromagnetism. The magnetic portion will contain the valuable constituents that is to say the metals to be recovered, for example platinum and the other precious metals of the platinum group, further nickel, cobalt and so on.

The agents which I employ in carrying out my invention are coal in any form, coal, coke, charcoal, sawdust, generator-gas, hydrogen, oil-vapours, benzol-vapours, and the like may be used for the purpose above intimated.

The invention is chiefly intended for use in extracting the metals of the platinum group from ores, rocks or any other materials containing such metals.

Now platinum metals are produced from the socalled platinum soaps and also from other materials. But there are ores, minerals, rocks, and other materials from which they cannot be obtained or recovered economically at the present state of the art, since the proportion of valuable materials in such minerals, rocks or ores is too low and the metallurgical methods hitherto suggested and practised for similar purposes are not applicable in connection with said materials, rocks or ores, since the expenses to be incurred thereby are too high.

In contradistinction to the known prior methods my invention insures the advantage of an economical production of the valuable metals from the above indicated minerals, rocks or ores and therefore is a marked advance in the art.

I am aware of the fact that it is known to render certain substances magnetic by roasting the same, so that they will be attracted by a magnet. But a mere heating operation fails to have the desired effect particularly as regards those minerals, rocks or ores which contain metals of the platinum group and other metals for example nickel.

According to my invention therefore the platiniferous and eventually nickel containing materials is not only heated, but heated in thorough contact with reducing agents and then cooled down, both in a non oxidizing atmosphere.

In the following I shall now proceed to describe more in detail, but for purposes of exemplification only, the manner in which a mineral containing platinum metals and nickel can be treated according to my invention.

A certain quantity of the mineral is disintegrated, so as to be in a finely divided state; a suitable amount of well pulverized coal is intimately mixed with the powdered ore, whereupon the mixture is heated in a suitable container to a gentle red-heat and thereafter allowed to cool down, both in a non oxidizing atmosphere. 5% reducing material of the weight of the ore may be used advantageously.

The thus treated and cooled material is adapted for use in any magnetic dressing or concentrating process. By the latter the material is divided in two portions; the metal containing portion obtained by means of such magnetic separation is enriched in platinum metals and eventually in nickel or the like, so that it may be economically subjected to the further usual treatment for the purpose of obtaining the metals in a more or less pure state.

I have not attempted to explain all of the minute details of the new method for they will be apparent to those skilled in the art to which the invention relates.

What I claim is:

1. In the process of recovering platinum from ores containing the same, these steps consisting in heating the said ores in thorough contact with reducing agents, cooling the ores and subjecting the cooled ores to a magnetic separating operation.

2. In the process of recovering platinum from ores containing the same, these steps consisting in heating the said ores in thorough contact with reducing agents in a non oxidizing atmosphere, cooling the ores and subjecting the cooled ores to a magnetic separating operation.

3. In the process of recovering platinum from ores containing the same, these steps consisting in heating the said ores in thorough contact with reducing agents to red heat, cooling the ores and subjecting the cooled ores to a magnetic separating operation.

4. In the process of recovering platinum from ores containing the same, these steps consisting in heating the said ores in a non oxidizing atmosphere to red heat, cooling the ores and subjecting the cooled ores to a magnetic separating operation.

5. In the process of recovering platinum from ores containing the same, these steps consisting in heating the said ores in thorough contact with reducing agents in a non oxidizing atmosphere, cooling the same in a non oxidizing atmosphere and subjecting the cooled ores to a magnetic separating operation.

6. In the process of recovering platinum from ores containing the same, these steps consisting in heating the said ores in thorough contact with reducing agents to red heat, cooling the same in a non oxidizing atmosphere and subjecting the cooled ores to a magnetic separating operation.

7. In the process of recovering platinum from ores containing the same, these steps consisting in heating the said ores in a non oxidizing atmosphere to red heat, cooling the same in a non oxidizing atmosphere and subjecting the cooled ores to a magnetic separating operation.

In testimony whereof I affix my signature.

Dr. JOSEF SAVELSBERG.